United States Patent [19]

Divis et al.

[11] Patent Number: 4,585,644

[45] Date of Patent: Apr. 29, 1986

[54] CHANGING OIL TUBES IN A CARBON BLACK REACTOR

[75] Inventors: Richard T. Divis, Ochelata; William R. Jones, Bartlesville, both of Okla.

[73] Assignee: Phillips Petroleum Company, Bartlesville, Okla.

[21] Appl. No.: 616,868

[22] Filed: Jun. 4, 1984

[51] Int. Cl.$^4$ ............................................. C01B 31/02
[52] U.S. Cl. .................................. 423/450; 422/150; 422/49; 423/457
[58] Field of Search .................. 134/22.15; 423/449, 423/450, 457, 461; 422/150–158, 49; 239/106, 112, 413, 416.1, 588

[56] References Cited

U.S. PATENT DOCUMENTS

| | | | |
|---|---|---|---|
| 456,111 | 7/1891 | Burns | 239/416.1 |
| 1,438,032 | 12/1922 | Frost | 423/450 |
| 2,013,302 | 9/1935 | Ferguson | 239/113 |
| 2,529,873 | 11/1950 | Heller | 422/158 |
| 2,768,067 | 10/1956 | Heller | 422/150 |
| 2,809,098 | 10/1957 | Larson | 422/156 |
| 3,266,934 | 8/1966 | Alexander | 134/22.15 |
| 3,381,896 | 5/1968 | Winters | 239/112 |
| 3,497,324 | 2/1970 | Lowen | 423/450 |
| 4,328,199 | 5/1982 | Cheng et al. | 423/450 |
| 4,418,049 | 11/1983 | Tillman | 423/450 |
| 4,427,553 | 1/1984 | Fore | 55/85 |

Primary Examiner—Bernard Nozick
Attorney, Agent, or Firm—French and Doescher

[57] ABSTRACT

A steam line is connected to the oil lines supplying feed to a carbon black reactor and valves are provided in each of the steam and oil lines so that either or both steam and oil can be fed to the oil tube emitting feed into the reactor. To change an oil nozzle without interrupting production, oil flow to a single nozzle is cut off and steam flow is provided while the nozzle is removed from the reactor. Steam flow is again provided as the replacement nozzle is inserted into the reactor and when it is in place, steam is cut off and oil flow resumed.

7 Claims, 1 Drawing Figure

CHANGING OIL TUBES IN A CARBON BLACK REACTOR

BACKGROUND OF THE INVENTION

In one aspect, the invention relates to carbon black production. In another aspect, the invention relates to an apparatus for producing carbon black. In yet another aspect, the invention relates to changing out feed tubes in a furnace.

In the production of carbon black from a carbonaceous make oil, it is frequently desirable to change the nozzle through which the make oil is emitted into the reaction flow passage of the reactor. This is because the properties of the carbon black being produced can be varied by changing the nozzles. For example, in certain types of carbon black reactors, changing from a nozzle which emits a 20° cone-shaped spray of feedstock to a nozzle which emits a 90° cone spray dramatically changes the properties of the black produced. Also, nozzles sometimes become plugged or burn off in the reactor and must be removed for repair or replacement. Further, the pressure drop across a set of nozzles can be altered by changing out one of them.

In many plant production systems, it could take operators an hour or more to change over the feedstock nozzles. During this time period, if the reactor were equipped with multiple nozzles, the carbon black being produced would not be on specification and thus could not be easily sold. Were the furnace to be shut down to replace the feedstock nozzle, the subsequent cooling of downstream processing equipment could make possible the formation of acidic condensate which can damage downstream equipment such as the filter bags. Also, downstream processes which rely upon the heat of the reactor such as the wet pellet dryer would encounter operational difficulties.

In reactors where the oil nozzle is exposed, shutting down the oil flow to remove the nozzle allows excessive heating of the nozzle by the reactor combustion gases and sometimes the nozzle is thereby damaged. The oil nozzle can also be damaged when it is inserted into the reactor without flow of oil going through it due to overheating.

A process to avoid overheating of the oil nozzles during changeout operations would be very desirable. A process which provides for changing out the oil nozzles without shutting down the reactor would be very desirable. A process which provides for rapid changeout of oil nozzles with minimal production of altered product would also be very desirable.

OBJECTS OF THE INVENTION

It is an object of this invention to provide an apparatus in which the oil nozzles can be changed without shutdown of operation.

It is a further object of this invention to provide an apparatus in which nozzle changeout can be carried out with minimal production of off-specification product.

It is yet another object of this invention to provide an apparatus in which the nozzles can be changed out with little danger of exposing the nozzle to excessively high temperatures.

It is another object of this invention to provide a process in which the above objects are satisfied.

STATEMENT OF THE INVENTION

In one aspect, there is provided a first tubular member having first and second ends with a nozzle attached to the first end. An oil source and a cooling fluid source are operatively associated with the first tubular member by a means for simultaneously or alternatively connecting the oil source and the cooling fluid source to the second end of the tubular member. When the apparatus is deployed in a furnace such as a carbon black reactor for the injection of oil, it can be removed for changeout of the nozzle by initiating the flow of cooling fluid, terminating the flow of oil and pulling the oil tube from the furnace. Where three of more of the oil tubes are deployed in a single furnace the cessation of oil flow through one of them will not alter product properties to an unacceptable extent.

BRIEF DESCRIPTION OF THE DRAWING

The FIGURE schematically illustrates a cross-sectional view of a carbon black reactor employing transverse injection of feedstock in the plane of the drawing.

DETAILED DESCRIPTION OF THE INVENTION

Figure 1:
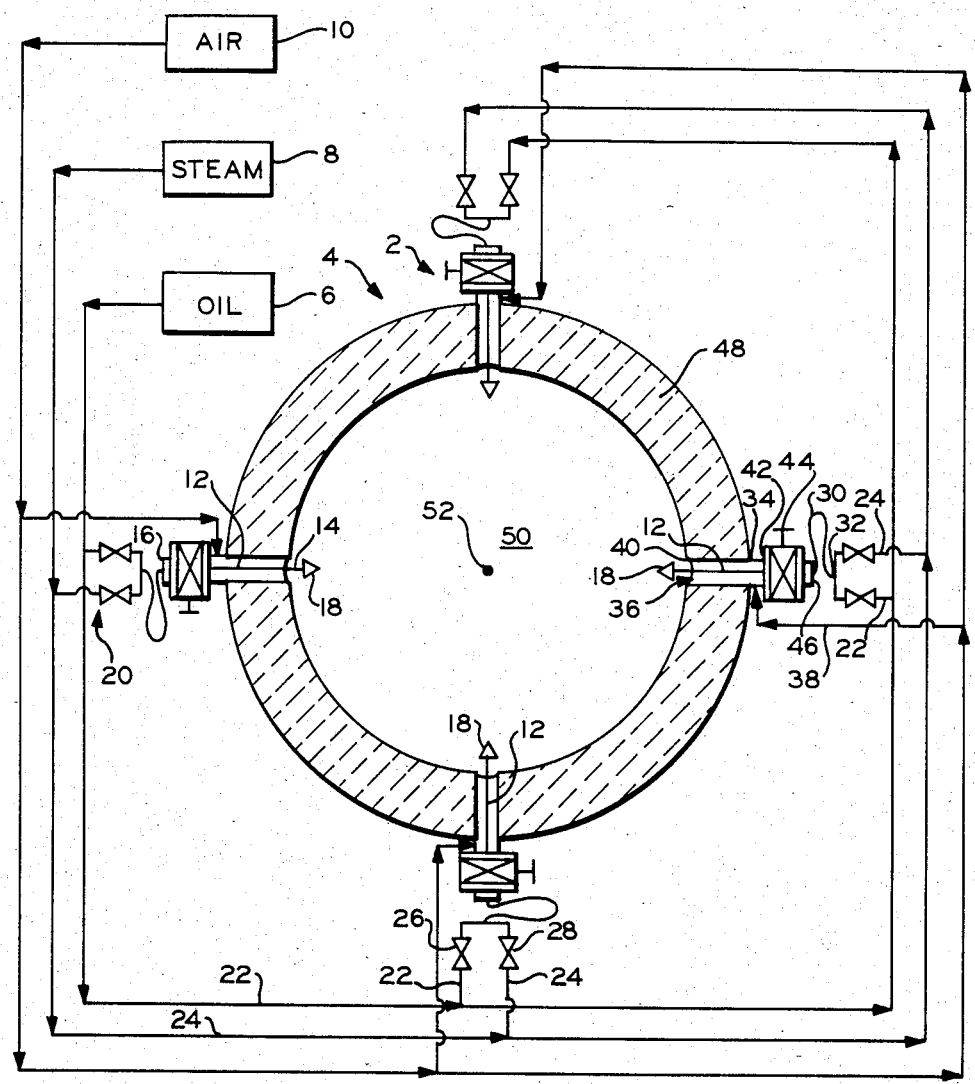

According to the invention, oil injectors 2 are provided for introducing a carbonaceous feedstock into a carbon black reactor 4. It is expected that equally good results will be obtained when the invention is applied to introduce most any combustible fluid into a furnace where temperatures are so high that the nozzle can be damaged by cessation of flow of combustible fluid through the nozzle.

The injectors 2 are connected to a source 6 of combustible fluid. For carbon black production, the fluid generally comprises a highly aromatic high boiling oil such as a coal tar or refinery residuum. A source 8 of a cooling fluid, preferably a gas, to avoid the formation of deposits during evaporation is also connected to each injector 2. The source 8 most preferably comprises steam because it is readily available and cheap, although other light gas such as nitrogen or air could be used, although air flow could cause problems such as ignition of the combustible deposits in the oil tube if any were present. Preferably, a source of continuous cooling gas flow, such as air source 10 is also connected to the injector assembly 2 to provide a sheath around the oil tube and assist in avoiding overheating the nozzle.

Each of the injectors 2 comprises a first tubular member 12, which can be an oil tube, having a first end 14 and a second end 16. A nozzle 18 is affixed to the first end 14 of the tubular member 12. Preferably, the nozzle 18 is of the monofluid type, although bifluid nozzles could also be utilized if desired. In the event that the invention were practiced with a bifluid nozzle, the nozzle would additionally be connected to the steam source or other atomizing gas by a separate line, not shown. The tubular member 12 is connected to the oil source 6 and the steam source 8 by a means 20 for the simultaneous or alternative connections of the tubular member 12 to the oil source 6 and the steam source 8.

Preferably, the means 20 comprises a conduit 22 which forms a flow path between the oil source 6 and the nozzle 18 and a conduit 24 which forms a flow path between the steam or other cooling gas source 8 and the nozzle 18. The conduit 22 preferably has a valve 26 positioned therein for control of the flow of oil therethrough. The conduit 24 preferably is provided with a valve 28 positioned therein to control the flow of steam therethrough. The valves 26 and 28 are preferably of the manual type. The conduits 22 and 24 are connected to the tubular member 12 so as to supply fluids to the nozzle 18.

For rapid nozzle changeout, it is preferred that a flexible conduit 30 be positioned between the conduits 22 and 24 and the tubular member 12. In one embodiment, the conduits 22 and 24 are connected to the tubular member 12 through a tee fitting 32. The conduit 22 is connected to the first branch of the tee fitting, the conduit 24 is connected to the second branch of the tee fitting 32, and the tubular member 12 is connected to the third branch of the tee fitting 32, preferably via the flexible hose 30.

In a preferred embodiment, a second tubular member 34 is positioned coaxially around a first tubular member 12 so that an annulus 36 is formed between the tubular member 12 and the tubular member 34. The air source 10 is connected to the annulus 36 by a suitable conduit means 38. The tubular member 34 has a first end 40 positioned adjacent the nozzle 18 generally flush with the reactor wall and a second end 42 with a valve 44 mounted thereon. The valve 44 contains a gate or plug member which is movable from a first position in which the tubular member 34 is opened to receipt of the tubular member 12 to a second position in which the tubular member 34 is closed to receipt of the tubular member 12. During nozzle changeout the gate or plug of the valve 44 is moved into the second position to close the flow passage and prevent the escape of reactor gases. A packing 46 is positioned adjacent the second end 16 of the tubular member to seal off the annulus 36 and the inside of the reactor from the outside when the valve 44 is in second position. A suitable packing can be formed with a gasket and the exterior of the tubular member 12 can be provided with an annular flange to engage a drawdown nut, not shown.

Preferably, the reactor 4 is provided with three or more of the oil tubes or injectors 2 so that the cessation of oil flow through one of the injectors will not have an intolerably large influence on the properties of carbon black being produced, as long as changeout is reasonably fast. Preferably, six injectors are used, although four will provide good results and are cheaper than six. Four or more oil tubes should be used for good results. The reactor 4 is generally formed from a generally tubular mass of refractory 48 which defines a flow passage 50 having a longitudinal axis 52. The tubes 12 are preferably oriented so that their longitudinal axes are perpendicular to the axis 52 of the reaction flow passage 50.

In operation, the oil tubes 12 are easily removed from the reactor when fouling or nozzle damage has occurred or where a change in the type of nozzle 18 being utilized is desired. To change out the oil tubes the valve 28 is opened and the valve 26 is closed to initiate the flow of steam into the oil tube and terminate the flow of oil. The flow of steam will prevent excessive heating of the nozzle 18. The oil tube 12 can be pulled from the reactor after the loosening of the packing 46. As the first end of the tube 12 clears the plug or gate in the valve 44, the valve 44 is placed in the closed position to prevent escape of gases from the reaction flow passage 50. Steam flow can be terminated and withdrawal or removal of the oil tube from the reactor completed readily.

Generally the flow of air annularly to the tube 12 is not interrupted because the flow of air assists in keeping the nozzle 18 cool and helps to prevent escape of reactor content through the valve 44.

Once the nozzle 18 has cleared the reaction flow passage the flow of steam can be terminated or, in any event, terminated prior to changing of the nozzle 18 once the oil tube has been removed from the reactor.

The procedure is simply reversed in order to install the oil tube.

The invention is illustrated by the following example.

EXAMPLE

Four oil feed tubes, which are 2'6" lengths of ⅜" Sch 80 316 stainless steel, with appropriate pipe fittings attached to each end, were used to feed oil radially to a carbon black reactor. A convenient length of 316 SS, Sch 80, ¾" dia. single braid flexible oil hose was attached to a first end of each oil tube. Fulljet spray nozzles, ⅜ G 9.5, available from Spraying Systems Co., 3201 Randolph St., Bellwood, IL, were attached to the second end of three of the oil tubes, and a ⅛ G 5 fulljet spray nozzle, also from Spraying Systems Co., was attached to the second end of the fourth oil feed tube.

The ⅜" oil tubes entered the reactor through an assembly comprising in seriatim; a 1" dia. Sch 80 pipe nipple PEXSE, 3" long welded to the reactor shell; a 1" dia full bore gate valve (VOGT 13111); a second 1" dia Sch 80 pipe nipple SEXSE, 3" long; a 1" dia WECO F18 200 pipe union; four 3/16"×3/16" asbestos packing rings; a 2¼" long packing gland, and a 1¾" long bushing. Thickness of the reactor wall, including shell, insulation, and refractory, was 15¼" at the point where the oil tubes were located.

The oil was sprayed into a reaction zone which converged from a 21" dia to an 8" dia (throat) over a length of 18½". Conduits for supplying oil, steam and purge air to the reactor were as shown in FIG. 1, except that the location of the oil injectors was rotated 45° to provide sufficient ground clearance.

With the reactor hot and operating, steam flow was initiated to one of the oil injectors and oil flow was terminated. With steam flow of 75 lb/hr at 100 psig through the oil tube, the bushing holding the packing gland in place was loosened; the gate valve 44 in FIG. 1 was open, the oil tube was pulled from the reactor, and the gate valve was closed. After changing out the nozzle on the oil tube that was removed from the reactor, the procedure was reversed in order to reinstall the oil tube. Time required for changing out the spray nozzle was from 3 to 5 minutes.

Reactor operating conditions and collected product specifications maintained while changing out the spray nozzle are shown in the table below:

TABLE

| | |
|---|---|
| Total Air | 248,499 SCFH |
| Gas | 16,067 SCFH |
| Oil | 555 GPH |
| API[1] | −2.3 |
| BMCI[2] | 127 |
| Air Temp | 1220° F. |
| Oil Temp | 259° F. |
| Tailpipe Temp | 1435° F. |
| Oil Noz. Pres | 139 psig |
| Oil No[2] Types | 3 G 9.5 & 1 G 5 |
| I$_2$[3] (No) | 84.7 |
| CTAB[4] (m$^2$/g) | 90 |
| DBP[5] (cc/100 g) | 111.1 |
| 24M4[6] (cc/100 g) | 89.7 |
| Tint[7] (% 1RB#3) | 109.6 |

| TABLE-continued | |
|---|---|
| Tint Residual[8] | 4.0 |
| Grit[9] (Wt. %) | .0040 |
| Type | N330 |

[1] API at 60° F.
[2] Bureau of Mines Correlation Index
[3] ASTM 1510-76
[4] ASTM D-3765-79
[5] ASTM D-2414-76
[6] ASTM D-3493-76
[7] ASTM D-3265-76
[8] $TR = T-[56.0 + 1.057(CTAB) - 0.002745(CTAB)^2 - 0.2596(24M4) - 0.201(N_2SA-CTAB)]$
where TR = tint residual
CTAB - See footnote[4] above
$N_2SA$ - Nitrogen surface area per ASTM D-3037-76
24M4 - See footnote[6] above
[9] ASTM D-1514-79

We claim:

1. Apparatus for producing carbon black comprising:
   (a) a first tubular member having a first end and a second end;
   (b) a nozzle connected to the first end of the first tubular member;
   (c) an oil source;
   (d) a cooling fluid source;
   (e) means for causing a simultaneous flow from the oil source and the cooling fluid source to the second end of the first tubular member and through the first tubular member to the nozzle;
   (f) means for adjusting the flow from the oil source to the second end of the first tubular means;
   (g) means for adjusting the flow from the cooling fluid source to the second end of the first tubular member;
   (h) a second tubular member positioned coaxially on the outer side with respect to the first tubular member, an annulus being formed between the first tubular member and the second tubular member;
   (i) a gate valve connected to the second tubular member, said gate valve containing a member moveable from a first position wherein a flow passage extending through said gate valve is open to a second position in which the flow passage extending through said gate valve is closed; wherein the first tubular member extends through the open flow passage in the gate valve and into the second tubular member;
   (j) an air source; and
   (k) means for providing a flow path from the air source to the annulus between the first tubular member and the second tubular member.

2. Apparatus as in claim 1 further comprising a packing positioned near the second end of the first tubular member to seal off the annulus between the first tubular member and the second tubular member when the plug member of the valve member is in the first position.

3. Apparatus comprising:
   a first tubular member having a first end and a second end;
   a nozzle connected to the first end of the first tubular member;
   an oil source;
   a steam source;
   a tee fitting;
   a first conduit means connecting the oil source and a first branch of the tee fitting;
   a valve positioned in said first conduit means for adjusting flow in said first conduit means;
   a second conduit means connecting the steam source and the second branch of the tee fitting;
   a valve positioned in said second conduit means for adjusting flow in said second conduit means;
   a flexible hose connecting the second end of the first tubular member and a third branch of the tee fitting;
   a generally tubular mass of refractory having an opening in a sidewall for receiving the first tubular member, said generally tubular mass of refractory defining the reaction flow passage of a carbon black reactor, said reaction flow passage having a longitudinal axis, and wherein the first tubular member has a longitudinal axis and is positioned through the sidewall of the generally tubular mass of refractory so that the longitudinal axis of the first tubular member is perpendicular to the longitudinal axis of the reaction flow passage of the carbon black reactor;
   a second tubular member positioned coaxially on the outer side with respect to the first tubular member; an annulus being formed between the first tubular member and the second tubular member;
   a gate valve connected to the second tubular member, said gate valve containing a member moveable from a first position wherein a flow passage extending through said gate valve is open to a second position in which the flow passage extending through said gate valve is closed; wherein the first tubular member extends through the open flow passage in the gate valve and into the second tubular member;
   an air source; and
   means for providing a flow path from the air source to the annulus between the first tubular member and the second tubular member.

4. An apparatus as in claim 3 wherein the apparatus is provided with four or more oil tubes.

5. A process for removing a feed oil tube introducing an oil flow into a carbon black reactor without shutdown of the reactor comprising:
   (a) initiating a steam flow into a feed oil tube connected by a flexible hose to a tee fitting which is connected to both a steam source and an oil feed source;
   (b) terminating the oil flow through said feed oil tube;
   (c) loosening a packing means around said feed oil tube sufficiently to allow withdrawal of said feed oil tube;
   (d) withdrawing said feed oil tube to clear the closing means of a valve on a tubular member providing access to said reactor;
   (e) closing said valve means on said tubular member; and
   (f) withdrawing said feed oil tube from said packing means of the carbon black reactor.

6. A process as in claim 5 further comprising introducing an air stream into the carbon black reactor in said tubular member annularly to the feed oil tube.

7. A process as in claim 5 further comprising terminating the steam flow when the end of the oil tube has been withdrawn past said closing member of said valve.

* * * * *